(12) United States Patent     (10) Patent No.:   US 12,621,334 B2

Galinski et al.     (45) Date of Patent:    May 5, 2026

(54) CYBERSECURITY RISK ASSESSMENT AND MEASUREMENT

(71) Applicant: QSecGrid, Inc., New York, NY (US)

(72) Inventors: John-Philip Galinski, Forest Hills, NY (US); Gordon Richard Winston, New York, NY (US)

(73) Assignee: QSecGrid, Inc., New York, NY (US)

( * ) Notice: Subject to any disclaimer, the term of this patent is extended or adjusted under 35 U.S.C. 154(b) by 131 days.

(21) Appl. No.: 18/214,853

(22) Filed: Jun. 27, 2023

(65) Prior Publication Data

US 2023/0421597 A1     Dec. 28, 2023

Related U.S. Application Data

(60) Provisional application No. 63/356,448, filed on Jun. 28, 2022.

(51) Int. Cl.
    *H04L 9/40*       (2022.01)
    *H04L 9/08*       (2006.01)

(52) U.S. Cl.
    CPC ........ *H04L 63/1433* (2013.01); *H04L 9/0852* (2013.01); *H04L 9/0869* (2013.01); *H04L 63/105* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2003/0005178 A1 | 1/2003 | Hemsath | |
| 2005/0264581 A1* | 12/2005 | Patrick | H04L 67/34 |
| | | | 345/594 |
| 2006/0101019 A1* | 5/2006 | Nelson | G06F 21/6218 |
| | | | 707/999.009 |
| 2007/0027872 A1* | 2/2007 | Johnson | G06F 21/604 |
| | | | 707/999.009 |

(Continued)

FOREIGN PATENT DOCUMENTS

| | | |
|---|---|---|
| KR | 20210032094 A | 3/2021 |
| WO | 2022106503 A1 | 5/2022 |

OTHER PUBLICATIONS

International Application No. PCT/US2023/026404, International Search Report and Written Opinion mailed Oct. 19, 2023, 6 pages.

(Continued)

*Primary Examiner* — William J. Goodchild
(74) *Attorney, Agent, or Firm* — Conley Rose, P.C.

(57)        ABSTRACT

A cross domain monitoring service is described herein. The cross domain monitoring service may receive a request of a requestor to associate a set of attributes to an access control set for a predetermined set of users with respect to a computing resource of a domain, which the set of attributes includes at least one of a read access privilege, a write access privilege, or an execute access privilege for the computing resource. In response to a determination that the requestor has a privilege to perform an association of the set of attributes to the access control set for the predetermined set of users, the cross domain monitoring service may update the access control set with the association to the set of attributes, in which the updating the access control set causes one or more cryptographic keys associated with the access control set to receive the sets of attributes.

20 Claims, 4 Drawing Sheets

(56)                    References Cited

U.S. PATENT DOCUMENTS

2008/0072290  A1*    3/2008   Metzer ............... G06F 16/2308
                                                                  726/2
2009/0328180  A1    12/2009   Coles et al.
2013/0208894  A1     8/2013   Bovino
2017/0214525  A1     7/2017   Zhao et al.
2019/0332790  A1    10/2019   Kukehalli Subramanya
2020/0358777  A1*   11/2020   Threlkeld  ............. H04L 9/0643
2021/0248226  A1     8/2021   Coady et al.
2022/0150059  A1     5/2022   Tanaka et al.
2022/0294615  A1*    9/2022   Russell  .................. G06F 21/57

OTHER PUBLICATIONS

International Application No. PCT/US2024/020985, International
Search Report and Written Opinion mailed Jan. 10, 2025, 10 pages.

* cited by examiner

100

200

300

400

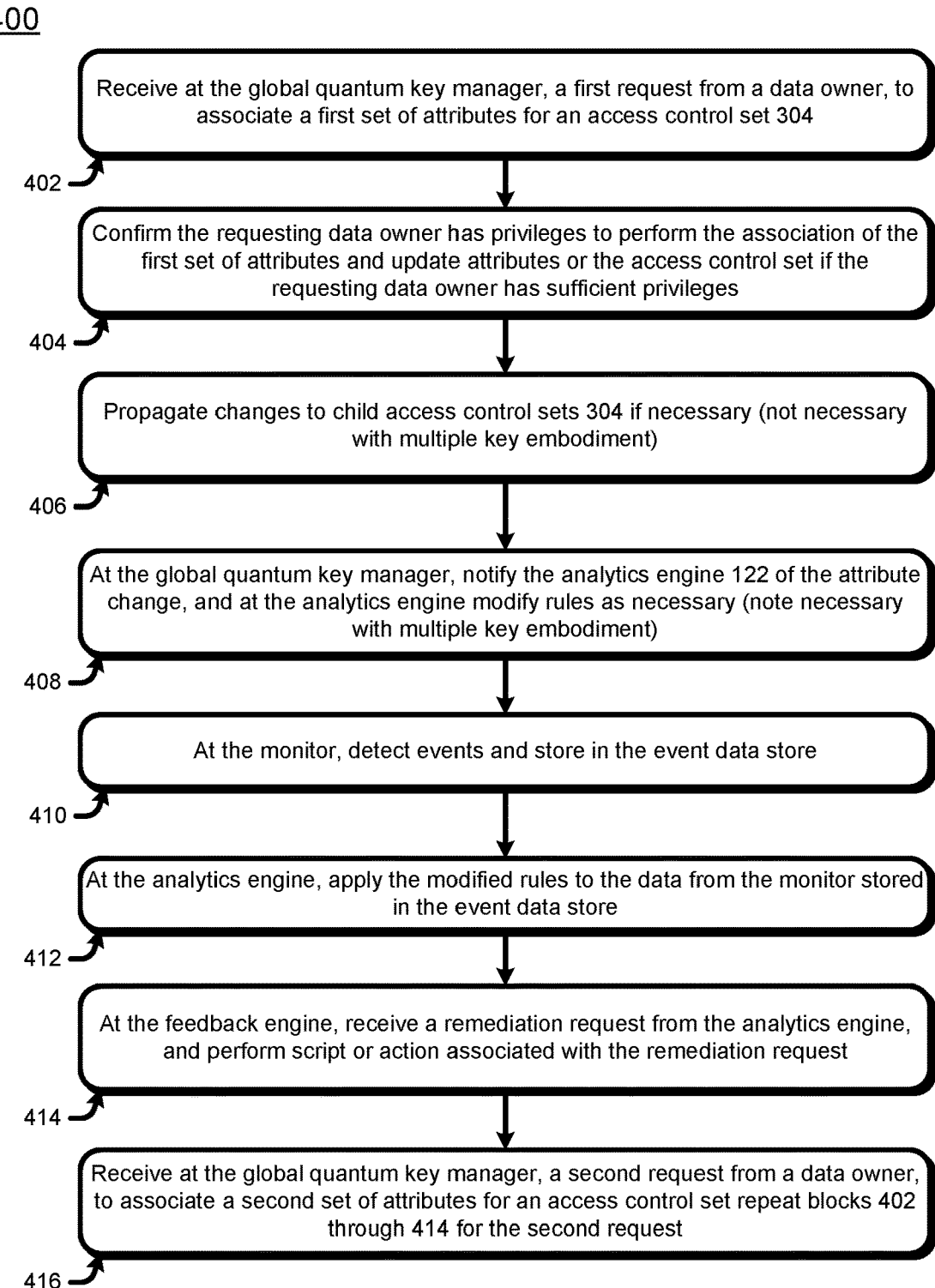

402 Receive at the global quantum key manager, a first request from a data owner, to associate a first set of attributes for an access control set 304

404 Confirm the requesting data owner has privileges to perform the association of the first set of attributes and update attributes or the access control set if the requesting data owner has sufficient privileges

406 Propagate changes to child access control sets 304 if necessary (not necessary with multiple key embodiment)

408 At the global quantum key manager, notify the analytics engine 122 of the attribute change, and at the analytics engine modify rules as necessary (note necessary with multiple key embodiment)

410 At the monitor, detect events and store in the event data store

412 At the analytics engine, apply the modified rules to the data from the monitor stored in the event data store

414 At the feedback engine, receive a remediation request from the analytics engine, and perform script or action associated with the remediation request

416 Receive at the global quantum key manager, a second request from a data owner, to associate a second set of attributes for an access control set repeat blocks 402 through 414 for the second request

Figure 4

CYBERSECURITY RISK ASSESSMENT AND MEASUREMENT

CROSS-REFERENCE TO RELATED PATENT APPLICATION

This application claims priority to U.S. Provisional Patent Application No. 63/356,448, filed on Jun. 28, 2022, entitled "Cybersecurity Risk Assessment and Measurement," which is hereby incorporated by reference in its entirety.

BACKGROUND

Enterprises and other establishments typically have computer infrastructure connected to networks including the Internet. Accordingly, this exposes that infrastructure to cybersecurity attacks. Cybersecurity attacks range from pranksters to petty criminals, to organized crime, and even in some cases to national governments seeking to misappropriate data or cause harm. According to NortonLife-Lock™, in 2021 more than 2,200 cybersecurity attacks occurred every day, an average of one every 39 seconds. The more prominent the enterprise or establishment, the more likely the attack.

Accordingly, enterprises and establishments have sought to ensure against the harm of cybersecurity attacks. Determining insurance coverage amounts can be performed via techniques to assess the cost of a successful cybersecurity attack ranging from repair and recovery of web pages to the cost of a data breach response. However, the ability to determine insurance premiums is predicated on an insurance provider's ability to create accurate actuarial tables and statistics to measure the risk of attack.

One of the difficulties in calculating statistics of cybersecurity risk is that presently there are no deterministic ways to quantify the number of cybersecurity attacks and successful cybersecurity attacks that an enterprise or establishment receives. Specifically, an enterprise may receive a cybersecurity attack that is not detected for months or even years. Furthermore, some unsuccessful cybersecurity attacks may go undetected as well. Accordingly, it is possible for an enterprise to believe that it has had zero successful attacks out of five, when in fact it has suffered two successful attacks out of nineteen. To a certain extent, enterprises and establishments, insurance companies, and other related parties are put in the position of "proving a negative," that is proving that no successful cybersecurity attacks have occurred.

For these and similar reasons, there is a need to be able to deterministically assess and measure cybersecurity attack frequency and success.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 is a flow chart of an exemplary operation of a hierarchical quantum key management system for cybersecurity risk assessment and measurement.

DETAILED DESCRIPTION

Figure 1:
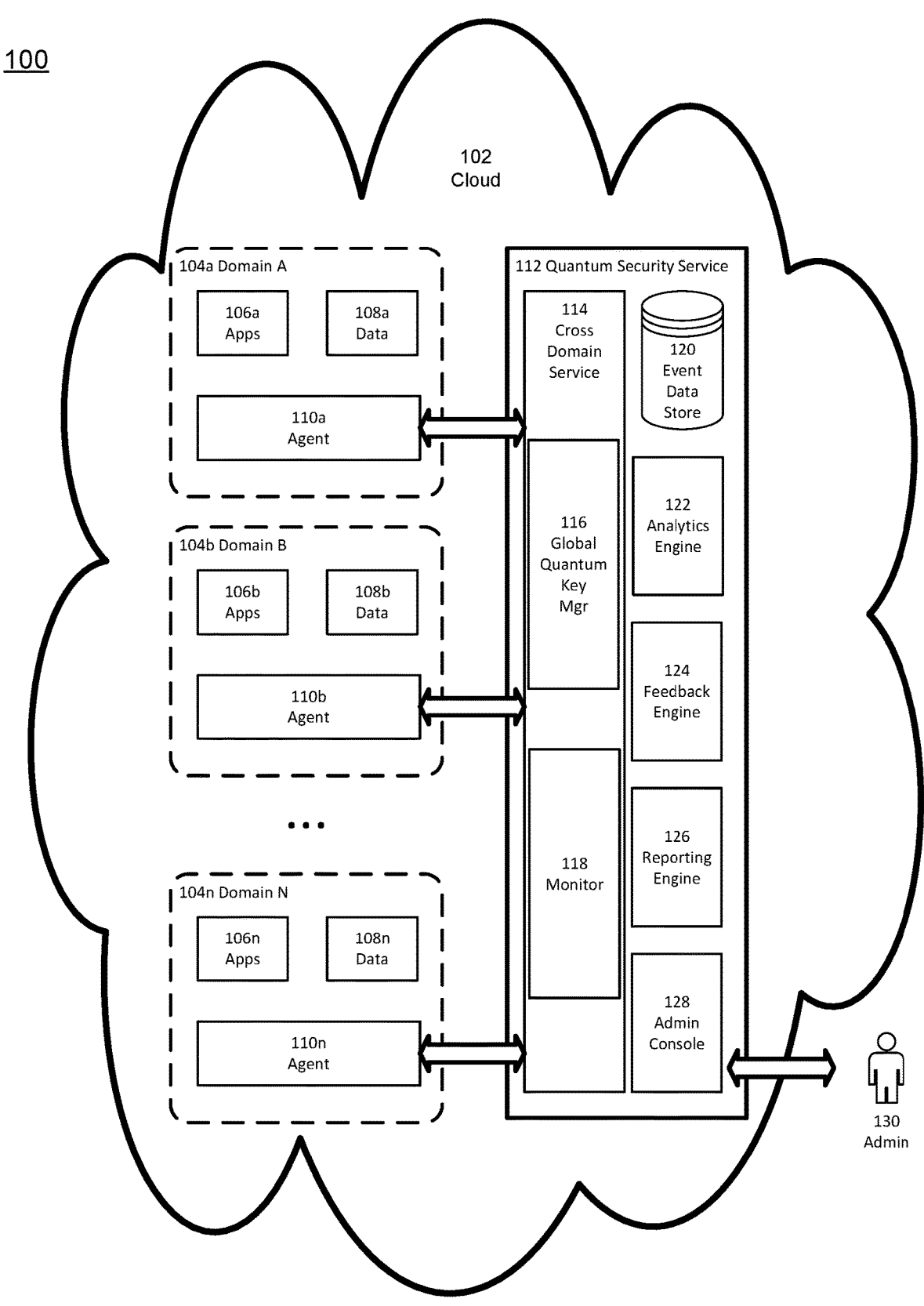
FIG. 1 is a diagram of an exemplary platform for cybersecurity risk assessment and measurement.

Context of Cybersecurity Risk Assessment and Measurement

Measurement is predicated on defining what is to be measured, that is to define the object of measurement. In the case of assessing and measuring cyberattacks, this may mean identifying anything from theft of data, to damaging or denying service to computing resources, or simply a breach of security where an unauthorized user, malicious or otherwise, gains access to computing resources.

Prior art services suffered from various deficiencies. First, there was no comprehensive survey of activity on all computing resources. In some instances, prior art parties might monitor activity on data files and applications. Other prior art parties might monitor activity on some, but not all computing resources, such as registry keys on the Microsoft Windows™ operating system. However, without monitoring all activity on all computing resources, there was always the possibility that an event would occur where an unauthorized and potentially malicious party might access a computing resource. If that computing resource was not monitored, then any access, authorized or not, was not detected and therefore not measured.

To address this deficiency, the present disclosure describes a cross domain monitoring service called a Quantum Security Service ("QSS") access to all resources, not just data files and applications. Specifically, if there is a computing resource that could be accessed by an application programming interface (API), then that API activity and the access of the resource is monitored. Computing resources include without limitation not only data files and applications, but also memory accesses, communications channels, process/thread creation facilities, and any other activity available programmatically. In the past, due to limitations of storage space, it might not have been practical to store monitoring data at such a comprehensive degree, but with the advent of large-scale storage facilities in the cloud, this is presently possible.

Any unauthorized party will have to make use of APIs, and by tracking all APIs and the resources accessible by the APIs, that unauthorized party will leave a detectable trace. In this way, the QSS can detect unauthorized accesses, even if the party does not alter data files or make use of applications.

Second, monitoring of resources was specific to a domain that a monitor had access to in the first place. Accordingly, if a data file were to be transferred from first domain to a second domain, a monitor might detect unauthorized activity while the data file was within the first domain, but not while it was in the second. Thus, when the data file returned from the second domain, the returning data file could not be fully trusted.

To address this deficiency, the QSS employs a multi-level global quantum key management system. Specifically, QSS implements a hierarchy of cryptographic keys that have scope beyond a single domain. In some cases, the cryptographic keys are one-use keys. To make management of these keys practical, the QSS has a novel key management system to make modifications of attributes and access control efficient. This key management system is described in further detail with respect to FIGS. 3 and 4 below.

Third was that monitoring of activity assumed that the scope of activity to be monitored was specific to a particular device, such as a personal computer or laptop. For example, monitoring registry keys would only be specific to a particular installation of Microsoft Windows™ on a particular computer. This assumption belies the realities of present cloud computing. Specifically, in cloud computing virtual machines and containers are instantiated and destroyed on demand, thereby creating the so-called "elastic cloud". While all computing resources, including temporary resources in elastic computing, should be and are to be monitored, the focus is detracted from cloud computing artifacts such as microservices, and network data communications channels.

Accordingly, the QSS treats cloud resources as primary resources to monitor. Presently, the most common way to access cloud resources is via cloud APIs, such as those implemented via JScript. QSS monitors access requests to the APIs, for example by monitoring OAuth 2.0 and similar token-based authorization exchanges. Then QSS monitors the programmatic invocation of those APIs. Finally, where data is to be passed back and forth, cloud specific formats such as JSON formatted data are also monitored. Note that lower-level activity as expressed by the underlying operating system API calls are also monitored. Thus, if for some reason the QSS monitors do not detect malicious activity at the cloud API level, the QSS monitors may alternatively detect malicious activity at the operating system API level. In this way, a form of defense in depth is achieved. Furthermore, where activity at the operating system API level may be too difficult to interpret, being able to monitor activity from the context of cloud activity will make clear whether the activity is malicious or not. For example, there may be a series of operating system calls to open up several communications ports and transfer data. However, seeing these calls as accessing a server, an authentication server, and a web service via an OAuth 2.0 exchange makes clear that a rules engine or analysis engine should be evaluating the activity in that context.

Fourth was that cryptographic keys could be compromised by state of the art cyberattacks. Specifically, legacy cryptographic keys are generally created via a hashing algorithm that makes use of a randomly generated seed value. However, automated generation of random numbers is a surprisingly difficult problem. If the security of the generated cryptographic keys is based on the distribution of the randomly generated seeds, and if the randomly generated seeds favor one side of the distribution, then the cryptographic keys would be likely to be proximate to each other. For example, a party could assume that because they were using 256-bit keys, that they had 256-bit security. But if the randomly generated seeds somehow clustered within a 48-bit field, the party would in fact have 48-bit security that could be compromised by an attack that knew to focus on that 48-bit field. This of course is an extreme example, but cybersecurity attacks can defeat otherwise statistically intractable problems by reducing the size of the field.

To address this deficiency, the QSS employs a quantum seed generator. A quantum seed generator makes use of quantum computing to ensure a smooth and non-clustered distribution of seeds for cryptographic keys. In this way, if a cryptographic key hash or key generation algorithm is known to uniformly distribute keys across an entire field, then the input seeds as being guaranteed to uniformly distribute seeds across a field, then a party can have confidence that the security of the cryptographic keys is indeed based on the size of the field.

This brief description is not intended to be a comprehensive enumeration of the benefits and advantages of the QSS, but rather to illustrate the context and approach underlying the QSS. Additional benefits and advantages of the QSS will be described in other sections.

Platform for Cybersecurity Risk Assessment and Measurement

The QSS can be conceived as a service, potentially based in the cloud, that manages keys, and monitors activity for a set of subscribing domains. FIG. 1 is a diagram of an exemplary platform for cybersecurity risk assessment and measurement.

FIG. 1 is a diagram 100 of the context of cybersecurity risk assessment and measurement. Specifically, the context is that of the cloud 102. The cloud 102 is a set of virtual machines and containers with network addresses exposed to the internet via a hypervisor. Cloud infrastructure is described in additional detail with respect to FIG. 2 below.

In the cloud 102, there may be one or more domains 104a, b . . . n that are owned by subscribers to the QSS service. Domains 104a, b . . . n each will have their own respective applications 106a, b . . . n, and their own respective data files 108a, b . . . n. Beyond applications 106a, b . . . n and data files 108a, b . . . n, each domain will have its own computing resources (not shown) including, process and thread management, memory, persistent storage (such as hard drives and solid-state drives), input/output resources, and communications channels (such as ports). In general, in the context of the QSS if an object is programmatically accessible via an API, it is considered a computing resource. The reason is that if that object is not accessible via an API, there is no way for a malicious party to access that object, and for purposes of the QSS, need not be tracked, and indeed might not be trackable at all.

In some embodiments, domains 104a, b . . . n, may each have one or more agents 110a, b . . . n that provide computing facilities to perform global quantum cryptographic key management, encryption, and decryption services and in some cases to perform monitoring of activity within the domains 104a, b . . . n. Agents may have scope across the entire domain, or alternatively may have scope limited to a set of applications or even a single application. There are many ways that agents 110a, b . . . n can monitor APIs. In one embodiment, each operating system API may be subject to a journaling hook, where the operating system calls and journaling hook handler are configured to take a trace of the respective API invocation. In other embodiments, the operating system may already have monitoring facilities for the agent 110a, b . . . n to enlist in. For example the Microsoft Windows™ operating system has a Windows Management Interface (WMI) module that may be used to monitor some APIs calls.

Agents 110a, b . . . n also contain programmatic facilities to find and access QSS facilities, such as acting as a broker. Note that such key management, encryption, decryption, and brokering services need not be within a domain 104a, b . . . n, and could potentially be managed by a service external to the domain. However, having local facilities in the form of one or more agents 110a, b . . . n may create a more performant embodiment as it limits the number and distance of network transactions to such a service external to the domain 110a, b . . . n.

The Quantum Security Service (QSS) 112 is also resident in the cloud 102. The QSS may be implemented as one or more cloud services and may be programmatically exposed via web APIs. In some embodiments, the QSS may be a set of microservices. The portion of the QSS that interfaces with the domains 110*a, b . . . n* is the cross-domain service 114. The cross-domain service 114 is comprised of a global quantum key manager 116 and a monitor 118. The global quantum key manager 116 receives requests for generating and serving cryptographic keys, single use and otherwise, and for managing attributes of those generated cryptographic keys. The global quantum key manager 116 is described in further detail with respect to FIGS. 3 and 4.

The monitor 118, aggregates data collected by agents 110*a, b . . . n* or alternatively as reported directly by domains via applications 106*a, b . . . n*. The monitor 118 may store all data, or a selected subset of data to event data store 120. The event data store 120 may be a dedicated storage server, or alternatively, may be implemented as one or more storage clusters within the cloud 102. Furthermore, the event data store 120 may be a database management system, such as a relational database management system thereby providing indexing facilities. Cloud services and databases are described in further detail with respect of FIG. 2 below.

Once monitor data is stored in the event data store 120, the stored data is subject to analytics via analytics engine 122. Analytics engine 122 makes use of machine learning and cognitive network algorithms to create a set of rules. Those rules are then used to determine whether or not a malicious event has occurred. For example, the monitor 118 may store data into the event data store 120 that some predetermined number of files has been rapidly encrypted, and the analytics engine 122 can trigger a response interpreting the events in aggregate as a ransomware attack. Similarly, the monitor 118 may store data into the event data store 120 that some predetermined threshold of access requests to the same localized set of communications network ports are being accessed by a discrete set of network addresses, and the analytics engine 122 can trigger a response interpreting the events in the aggregate as a distributed denial of service (DDOS) attack.

Responses requested by the analytics engine 122 are effected via the feedback engine 124. The feedback engine 124 can deploy a predetermined remediation response on request. Remediation may be effected by a single call, or may be a script of calls constituting the remediation. The remediation responses may be manually programmed by an administrator or may be received from third parties.

Interpretations of data by the analytics engine 122, remediation responses by the feedback engine 124, and other states such as provided by the global quantum key manager 116 are reported via the reporting engine 126. Reports from the reporting engine 126 may be pre-programmed. Alternatively, the reporting engine 126 may be implemented as a dynamic query facility, such as that provided via a relational database management system.

The feedback engine 124 takes inputs from two sources. First is the global quantum key manager 116 and the second is the analytics engine 122. Among other things, the global quantum key manager 116 sets access control to computing resources, and tracks access to those computing resources. Accordingly, the global quantum key manager 116 provides static and semi-static state information about what is authorized for computing resources. Specifically, whether a particular data file is only to be accessed by Alice and Bob, but not Carol, is tracked by the global quantum key manager 116. This is a static state of affairs. However, if Carol is also granted access, but not Ted, then this change is also tracked by the global quantum key manager 116 and represents a semi-static state of affairs. Based on access control and attributes of keys in general, the feedback engine 124 may interpret the stored data in the event data store 120 more accurately by virtue of increased contextual information. The global quantum key manager 116 is described in further detail with respect to FIGS. 3 and 4 below.

The analytics engine 122 provides a dynamic aspect to the feedback engine 124. Specifically, as data in the event data store 120 is interpreted by the analytics engine 122, the analytics engine 122 may request a remediation response by the feedback engine 124. The feedback engine 124 maps a remediation request from another QSS 112 software component such as the analytics engine 122 or alternatively from an administrative console 128, to a pre-programmed response, then executes that pre-programmed response.

Administration console 128 provides the facility for an administrator 130 to review and if necessary, intervene in the QSS 112. The administration console 128 is used to run both static reports and dynamic queries via the reporting engine 126, to add responses to the feedback engine 124, to review and modify rules in the analytics engine 122, and to administer keys manually, if necessary, via the global quantum key manager 116.

The foregoing is but one potential embodiment of a QSS for cybersecurity risk assessment and measurement and is not intended to be limiting.

Exemplary Environment for Cybersecurity Risk Assessment and Measurement

Figure 2:
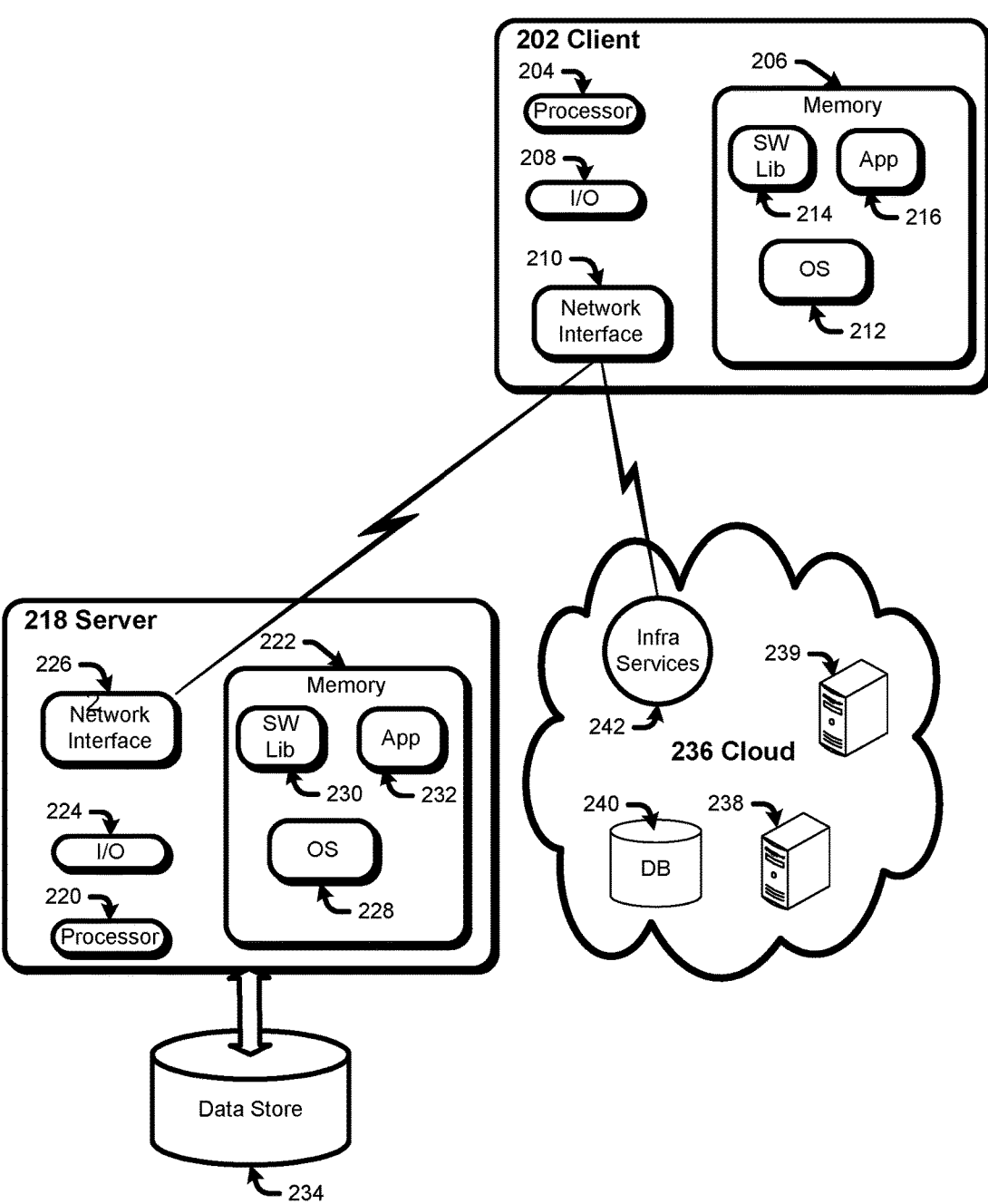
FIG. 2 is a diagram of an exemplary hardware, software, and communications computing environment for cybersecurity risk assessment and measurement.

Before describing cybersecurity risk assessment and measurement, via FIG. 2, we describe in a diagram 200 an exemplary hardware, software, and communications computing environment. Specifically, the functionality for cybersecurity risk assessment and measurement is generally hosted on a computing device. Exemplary computing devices include without limitation personal computers, laptops, embedded devices, tablet computers, smart phones, and virtual machines. In many cases, computing devices are to be networked.

One computing device may be a client computing device 202. The client computing device 202 may have a processor 204 and a memory 206. The processor may be a central processing unit, a repurposed graphical processing unit, and/or a dedicated controller such as a microcontroller. The client computing device 202 may further include an input/output (I/O) interface 208, and/or a network interface 210. The I/O interface 208 may be any controller card, such as a universal asynchronous receiver/transmitter (UART) used in conjunction with a standard I/O interface protocol such as RS-232 and/or Universal Serial Bus (USB). The network interface 210, may potentially work in concert with the I/O interface 208 and may be a network interface card supporting Ethernet and/or Wi-Fi and/or any number of other physical and/or datalink protocols.

Memory 206 is any computer-readable media which may store software components including an operating system 212, software libraries 214, and/or software applications 216. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable, and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanisms. As defined herein, computer storage media does not include communication media.

A server 218 is any computing device that may participate in a network. The network may be, without limitation, a local area network ("LAN"), a virtual private network ("VPN"), a cellular network, or the Internet. The server 218 is similar to the host computer for the image capture function. Specifically, it will include a processor 220, a memory 222, an input/output interface 224, and/or a network interface. In the memory will be an operating system 228, software libraries 230, and server-side applications 232. Server-side applications include file servers and databases including relational databases. Accordingly, the server 218 may have a data store 234 comprising one or more hard drives or other persistent storage devices.

A service on the cloud 236 may provide the services of a server 218. In general, servers may either be a physical dedicated server, or may be embodied in a virtual machine. In the latter case, the cloud 236 may represent a plurality of disaggregated servers that provide virtual application server 239 functionality and virtual storage/database 240 functionality. The disaggregated servers are physical computer servers, which may have a processor, a memory, an I/O interface and/or a network interface. The features and variations of the processor, the memory, the I/O interface and the network interface are substantially similar to those described for the server 218. Differences may be where the disaggregated servers are optimized for throughput and/or for disaggregation.

Cloud 236 services 238 and 240 may be made accessible via an integrated cloud infrastructure 242. Cloud infrastructure 242 not only provides access to cloud services 238 and 240 but also to billing services and other monetization services. Cloud infrastructure 242 may provide additional service abstractions such as Platform as a Service ("PAAS"), Infrastructure as a Service ("IAAS"), and Software as a Service ("SAAS").

Global Quantum Key Management for Cybersecurity Risk Assessment and Measurement

One of the issues addressed by the QSS 112 is the efficient management of quantum keys, that is to say, cryptographic keys that make use of a quantum seed as described above. Quantum seeds may be accessed through third party services, or via open-source quantum seed services. Where a computing resource is to be accessed, one or more quantum keys may be associated with the computing resource. In some cases, the quantum keys may be single use.

The result is that quantum keys are to be associated with attributes and with computing resources frequently. A performant system involves associating the keys with the resources and attributes. The global quantum key manager 116 makes use of a novel directory system to effect performance and scalability.

Figure 3:
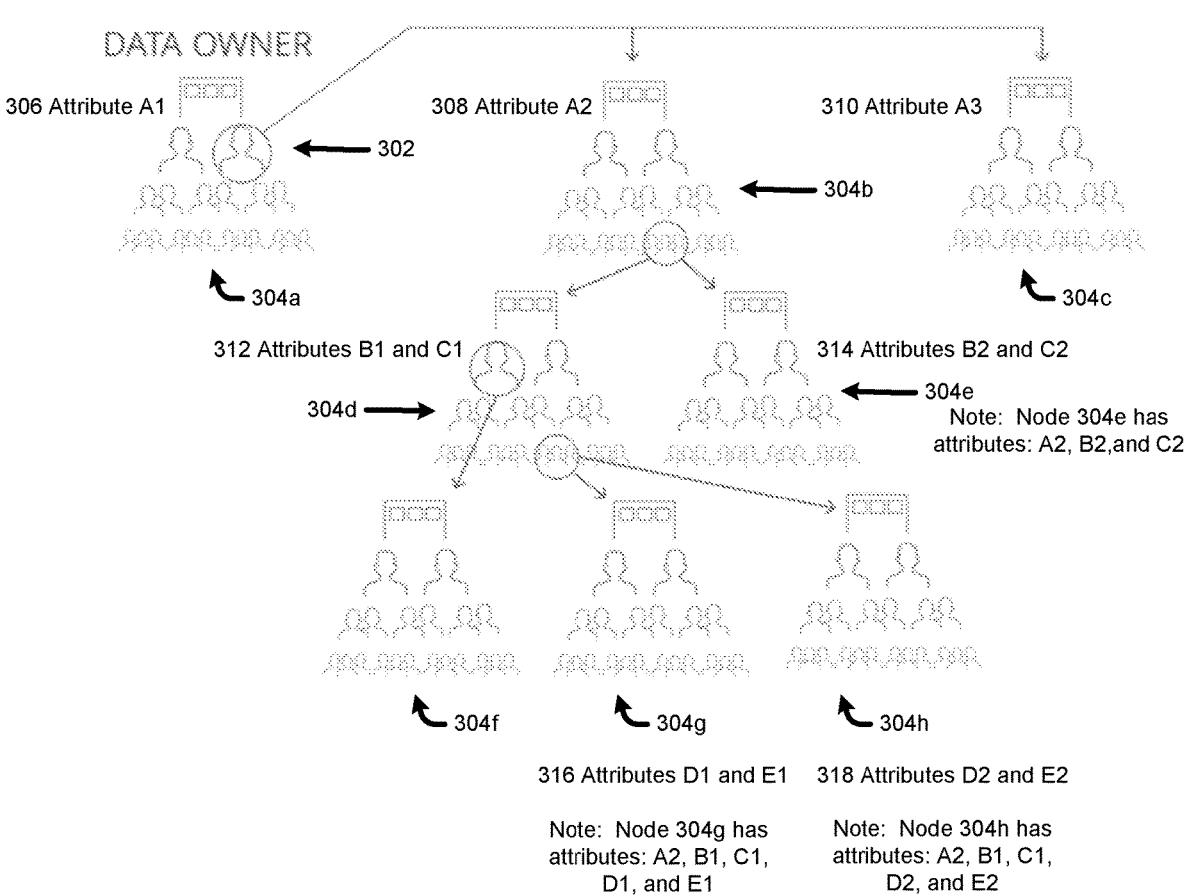
FIG. 3 is a diagram of an exemplary hierarchical quantum key management system for cybersecurity risk assessment and measurement.

FIG. 3 is a diagram 300 illustrating an example of this directory system. A data owner 302 has a set of privileges to one or more computing resources. As previously stated, computing resources are not necessarily only data files and applications, but anything that may be programmatically accessed via an API and thereby tracked.

Computing resources are associated with one or more access control sets 304. An access control set 304 is a set of attributes for anything associated with that access control set 304 for a predetermined set of users, potentially including the data owner 302. For example, if there is a data file X, and it is associated access control set 304a, it will be associated with attribute 306 A1 for anyone in the access control set 304a.

However, data file X may also be associated with access control set 304b; it will be associated with attribute 308 A2 for anyone in the access control set 304b. We can also associate attribute 310 A3 for anyone in the access control set 304c. Note that attribute 308 A2 and attribute 310 A3 may be different from attribute 306 A1. This is because access control sets 304 have scope of a computing resource associated with a user. An example attribute is that all users of access control set 304b have read access to data file X.

Similarly, where data file X is associated with access control set 304c, it is associated with attribute 310 A3. Thus, anyone associated with 304c would have access to data file X, and any other computing resource associated with access control set 304c with whatever privilege was associated with attribute A3.

A feature of an access control set 304 is that when a quantum key is generated by the global quantum key manager 116, that generated key is to be associated with a computing resource. A fast way to do so is to associate the key with the access control set 304. Thus, the association may occur in a single step.

Access control sets 304 are hierarchical and child access control sets 304 inherit attributes from parent access control sets 304. In FIG. 3, access control sets 304d and 304e are children of access control set 304b. Similarly, access control sets 304g and 304h are children of access control set 304d. Access control set 304d has attributes 312 B1 and C1 that are associated with it. But note that access control set 304d also inherits attribute 308 A2, and therefore has attributes A2, B1, and C1. This is in contrast to access control set 304e, which has attributes 314 B2 and C2 that are associated with it, inherits attribute 308 A2, and therefore has attributes A2, B2, and C2.

This state of affairs can continue indefinitely. Say that access control sets 304g and 304h are associated with attributes 316 D1 and E1, and attributes 318 D2 and E2 respectively. By virtue of inheritance, access control set 304g would be associated with attributes A2, B1, C1, D1, and E1, and access control set 304g would be associated with attributes A2, B1, C1, D2, and E2 respectively.

The hierarchical structure provides the benefit of fast propagation of attributes. Say that the global quantum key manager generates two one-use quantum keys. The generated keys can be associated with a child in the access control set 304g corresponding to the request. A user may access a file and associate one of the generated one-use keys with that file thereby consuming that one-use key. However, in the interim, an administrator changes the attributes to a parent access control set, say the access control set 304b. The changes propagate to the access control set 304g via inheritance. As a result, when a subsequent user accesses another file associated with the access control set 304g and accesses a generated one-use key, events are interpreted according to the updated attribute. This process is described in further detail with respect to FIG. 4.

In practice, the global quantum key manager 116 makes use of global keys. This is effected by potentially aggregating standard cryptographic keys. Because of the hierarchical structure for key management, different keys can be aggregated by different access control sets 304. So a first key may be associated with 304*b*, another with 304*d*, and a third with 304*g*. In this way, verification of an access control set 304 may be effected simply by checking a single key associated with that access control set 304 instead of all the keys in the access control set inheritance chain.

The hierarchical structure used by the global quantum key manager 116 may be configured to follow an enterprise organization. For example, there may be an enterprise level, a department level, a manager level, a team level, and an individual staff level. There may also be a global level above that of an enterprise. Consider the case where a party passes away. If the party is associated with the top-level access control set 304, then associated data may be potentially locked forever. However, with a global level above, there may be an override. Similarly, in the case of enterprises, there may be a situation where law enforcement requests access to certain data files. Again, a global level may provide an overriding privilege to access what otherwise would be inaccessible data files.

Also in practice, the global quantum key manager 116 will be distributed and/or decentralized. Distributed infrastructure for networked resource directory facilities such as LDAP/Open Directory and ActiveDirectory from Microsoft™ may be used to implement the associations in a distributed fashion. Where the attributes are to be decentralized, distributed databases such as CouchDB, or even blockchains, may be used to implement decentralization and consensus.

Dynamic Response for Cybersecurity Risk Assessment and Measurement

FIG. 4 is a flow chart of an example operation of the global quantum key manager 116, including propagation of changes to access control sets 304.

In block 402, the global quantum key manager 116 receives a first request from a requestor, e.g., a data owner, to associate a first set of attributes to an access control set 304. Example attributes may be read access, write access, or execute access for a data file. For computing resources, such as communications ports or memory access, other resource-specific privileges may apply. In practice, many operating systems, such as Unix and Microsoft Windows™ analogize access to computing resources as files. For example, in the Microsoft Windows™ API, CreateFile( ) may be used to access a communications channel.

In block 404, the global quantum key manager 116 verifies that the requestor is in a fact a data owner or otherwise authenticates the requestor as having privileges. If this is the case, not only are the attributes updated, but any cryptographic key also associated with the access control set 304, one-use or otherwise, receives (e.g., inherits) those attributes immediately by virtue of association.

In block 406, in some embodiments the changes to the access control set 304 is propagated to child sets. However, in one embodiment, propagation occurs automatically. Specifically, a resource on a child access control set, such as 304*g*, is associated with keys from its parents, specifically 304*d* and 304*b*. Accordingly, if the attributes for 304*b* are changed, and if 304*g* is already associated with 304*b* by having a key from 304*b*, there are no changes to propagate.

In block 408, in some embodiments the analytics engine 122 may be notified by the global quantum key manager 116 of the changes. In this way, the analytics engine 122 may immediately change rules to interpret received events. However, in an alternative embodiment, the analytics engine 122 may simply receive events, and add the attributes of the relevant subject access control sets 304, potentially associated with the cryptographic keys for each respective access control set 304, and thereby not require notification.

Specifically, by using the attributes of the access control sets 304 as just another set of observables, any machine learning or cognitive network algorithms used by the analytics engine 122 will automatically take those attributes into account.

In block 410, the monitor 118 detects events and stores those events in the event data store 120. In block 412, the analytics engine 122 will then analyze those events using to determine whether an adverse or other event is occurring. In block 414, the analytics engine 122 will send a remediation request to the feedback engine 124, and the feedback engine 124 will look up the associated remediation action or script previously programmed by an administrator 130. The processes of blocks 410, 412, and 414 are described additionally with respect to FIG. 1 above.

In block 416, the global quantum key manager 116, receives a second request from a data owner, to associate a second set of attributes for the same access control set 304. At this point, blocks 402 through 414 are repeated.

Note that one of the results of the multiple key configuration of the global quantum key manager 116 is speed and scalability. A data file X can be associated with access control set A and access control set B. Both A and B can have their own one-use keys. A and B can also have their own attributes. By virtue of associating data file X with both A and B, when the key for A is changed, data file X is changed. There is no propagation mechanism necessary. As stated above, where the analytics engine 122 treats attributes as other observables for the machine learning or cognitive network algorithm applied, there is no need for notifications between the global quantum key manager 116 and the analytics engine 122.

Deterministic Cybersecurity Risk Assessment and Measurement

We now turn the discussion to risk assessment and measurement. As previously stated, prior art systems kept statistics on recognized cybersecurity breaches and adverse events. This assumed that a breach or adverse event was recognized immediately. This is not the case as many breaches and adverse events go undetected for months or years.

With the QSS 112, all API events are tracked. In the case where there are cloud APIs, applications APIs, and operating system APIs, all are tracked to provide detectability in depth. Because all API events are tracked, the QSS 112 can provide better statistics.

Specifically, say there is a situation where we want to determine the risk of a distributed denial of service (DDOS) attack. When the DDOS occurs, the enterprise knows it—it suffers from an operational shutdown. However, if we want to detect preliminary probes by a malicious actor prior to a DDOS, prior art systems may not be able to detect such incursions.

By sharing data across domains, the QSS 112 can hypothesize from a successful DDOS in one domain that a particular observed pattern is a precursor to a DDOS. By observing those patterns in other domains, the QSS 112 can confirm that the pattern is in fact a precursor to a DDOS.

This has several results. First, QSS 112 is able to measure the incidence of this hitherto unobserved pattern. In fact, this pattern can be applied to historical data to determine whether a breach or adverse event occurred, and simply was not recognized at the time. Second, the QSS 112 can put rules into place to remediate this pattern, for example to rotate IP port addresses. Third, the QSS 112 is able to provide statistics of the likelihood of a DDOS based on this pattern information. Fourth, the QSS 112 is able to look at the lower-level operating system APIs to determine how the patterns are being effected. In this way, fundamental cybersecurity defensive weaknesses can be identified and therefore remediated.

The detection of breaches and adverse events is qualitative in nature. The QSS 112 lends itself to quantitative measurement. As stated above, by having access to a global set of data, the QSS 112 has the best ability to determine the total set of actual events and potential events and thereby create a percentage, or a statistical risk measurement. Prior art systems that merely measured actual events had no denominator (i.e., the number of potential events) to calculate risk. Furthermore, as the QSS 112 is able to historically evaluate data (apply new patterns to historical data to determine if there was a previously undetected breach or adverse event), it can generate a proper numerator (i.e., the number of actual events).

This degree of measurement lends itself for doing statistical operations. Recall that measures come in various types. One kind of measure merely categorizes issues (e.g., red, blue, green). A more sophisticated measure orders the categories (e.g., good, better, best). Note that while an order is set forth, we don't have a way to say how much better, better is than good, we merely know that it is higher up in the order. A more sophisticated measure allows additional (and subtraction) operations. Thus, we are able to say that breach A was worse than breach B and breach C combined. Finally, a yet more sophisticated measure allows multiplication and division operations. The consequence of a measure supporting such operations is that one can now calculation items such as standard deviation and other statistical calculations based on arithmetic.

Being able to calculate a denominator is only possible if all events are tracked, and the QSS 112 tracks all events involving an API therefore being able to perform statistical calculations. Accordingly, the QSS 112 is able to provide likelihood of risk calculations improved over the prior art.

Use Cases for Cybersecurity Risk Assessment and Measurement

A first use case for cybersecurity risk assessment and measurement is dynamic adaptation and remediation. When an analytics engine 122 interprets incoming data, not only can it detect a pattern, the analytics engine 122 can also calculate a risk. The risk calculation may be some function of likelihood of risk, and degree of severity. This allows the analytics engine 122 to rank and prioritize remediation requests to the feedback engine 124. Specifically, the analytics engine 122 may create a queue of requests rank ordered by priority and would dispatch to the feedback engine 124.

This is particularly useful where there are several monitors 118 feeding into a single feedback engine 124, it enables the ordered queuing or remediation requests. In one case, the feedback engine 124 to serialize remediation requests to eliminate duplicates and to make a master priority queue. Note that where duplicate requests are queued, they will be proximate to each other thereby providing efficiency in removing duplicates. Because the QSS 112 is able to create statistical measures as described above a second use case is to create actuarial tables to calculate insurable risk.

It is worth examining the different sets of information that can be subjected to machine learning and cognitive network algorithms. The more context, the more accurate the analysis. While some information is directly observed by the QSS 112 from the data and events itself, additional information can be provided by the information technology (IT) department and other sources. Generally, if a data artifact, such as a file or computing resource is called, then the event data can be collected. Beyond the artifact itself, the QSS 112 can observe the APIs at the cloud, application, and operating system levels. Even beyond the direct observation, the practices of the IT group can be input into the analytics engine 122. Finally, the administrator 130 can provide information such as user behavior patterns such as degree of compliance.

A corollary to the above is that this external data can be used to make more predictive and accurate actuarial tables. The supplementary information (i.e., information not directly measured on data artifacts or via APIs) may be collected via an insurance questionnaire. Example questions may include types of exposure (i.e., kinds and degrees of risks), types of assets (i.e., to determine a threat surface), historical data (which is now more accurate), and impact assessment questions. Furthermore, each of these categories may be further broken down into lower-level details.

One insight is that the type of questionnaire created to collect more information can be evaluated against the analytics model used. Specifically, an administrator 130 may determine that the predictive nature of the analytics model improves with certain classes of information. Accordingly, the QSS 112 may be a source of improving questionnaires used by cybersecurity insurance assessments.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable media storing computer-executable instructions that upon execution cause one or more processors to perform acts comprising:

receiving a request of a requestor to associate a set of attributes to an access control set for a predetermined set of users with respect to a computing resource of a domain, the set of attributes including at least one of a read access privilege, a write access privilege, or an execute access privilege for the computing resource; and in response to a determination that the requestor has a privilege to perform an association of the set of attributes to the access control set for the predetermined set of users, updating the access control set with the association to the set of attributes, wherein the updating the access control set causes one or more cryptographic keys associated with the access control set to receive the set of attributes;

aggregating data across a plurality of domains, including the domain; and determining from the aggregated data whether a malicious event has occurred in one or more of the plurality of domains.

2. The one or more non-transitory computer-readable media of claim 1, wherein the acts further comprise propagating the association of the set of attributes to one or more child access control sets of the access control set such that the one or more child access control sets inherit the set of attributes.

3. The one or more non-transitory computer-readable media of claim 2, wherein a child access control set of the one or more child access control sets further includes an additional set of attributes that is independent from the set of attributes.

4. The one or more non-transitory computer-readable media of claim 1, wherein the access control set includes one or more child access control sets that are associated with the one or more cryptographic keys, and wherein the updating the access control set automatically propagates the set of attributes to the one or more child access control sets of the access control set.

5. The one or more non-transitory computer-readable media of claim 1, wherein the one or more cryptographic keys include a key for accessing the computing resource.

6. The one or more non-transitory computer-readable media of claim 5, wherein the key is a one-use key for accessing the computing resource.

7. The one or more non-transitory computer-readable media of claim 1, wherein the computing resource is a data file, and wherein the one or more cryptographic keys include a cryptographic key for accessing the data file.

8. The one or more non-transitory computer-readable media of claim 1, wherein the one or more cryptographic keys include a quantum cryptographic key generated using a quantum seed generator.

9. The one or more non-transitory computer-readable media of claim 1, wherein the acts further comprise sending a notification to an analytics engine of one or more events that include the association of the set of attributes to the access control set for the predetermined set of users.

10. The one or more non-transitory computer-readable media of claim 9, wherein the sending of the notification of the one or events to the analytics engine causes the analytics engine to interpret the one or more events.

11. The one or more non-transitory computer-readable media of claim 9, wherein the sending of the notification of the one or events to the analytics engine causes the analytics engine to interpret the one or more events and trigger a remediation action based on an interpretation of the one or more events.

12. The one or more non-transitory computer-readable media of claim 9, wherein the sending of the one or events to the analytics engine causes the analytics engine to add associations of the set of attributes, the access control set, and the one or more cryptographic keys to an event data store.

13. The one or more non-transitory computer-readable media of claim 1, wherein the acts further comprise:
    receiving an additional request to associate an additional set of attributes to the access control set for the predetermined set of users; and
    updating the access control set with an additional association with the additional set of attributes.

14. The one or more non-transitory computer-readable media of claim 1, wherein the computing resource is further associated with an additional access control set for an additional predetermined set of users.

15. The one or more non-transitory computer-readable media of claim 14, wherein the additional access control set is associated with an additional set of attributes and one or more additional cryptographic keys.

16. The one or more non-transitory computer-readable media of claim 1, wherein the acts further comprise tracking application program interface (API) events from a set of APIs associated with the domain that at least include cloud APIs of cloud computing resources.

17. The one or more non-transitory computer-readable media of claim 16, wherein the acts further comprise:
    analyzing the API events to detect at least one of a set of one or more adverse events and a set of one or more potentially adverse events; and
    generating one or more statistical risk measurements based on the set of one or more adverse events and the set of one or more potentially adverse events.

18. The one or more non-transitory computer-readable media of claim 17, wherein the acts further comprise creating an actuarial table for calculating insurable risk based on the one or more statistical risk measurements.

19. A system, comprising:
    one or more processors;
    a global quantum key manager including a plurality of computer-executable components that are executable by the one or more processors to perform a plurality of actions, the plurality of actions comprising:
        receiving a request of a requestor to associate a set of attributes to an access control set for a predetermined set of users with respect to a computing resource of a domain, the set of attributes including at least one of a read access privilege, a write access privilege, or an execute access privilege for the computing resource; and
        in response to a determination that the requestor has a privilege to perform an association of the set of attributes to the access control set for the predetermined set of users, updating the access control set with the association to the set of attributes,
        wherein the updating the access control set causes one or more cryptographic keys associated with the access control set to receive the set of attributes;
    a monitor including a plurality of computer-executable components that are executable by the one or more processors to perform a plurality of actions, the plurality of actions comprising aggregating data across a plurality of domains, including the domain; and
    an analytics engine including a plurality of computer-executable components that are executable by the one or more processors to perform a plurality of actions, the plurality of actions comprising determining from the aggregated data whether a malicious event has occurred in one or more of the plurality of domains.

20. A computer-implemented method, comprising:
    receiving, at a monitoring service, a request of a requestor to associate a set of attributes to an access control set for a predetermined set of users with respect to a computing resource of a domain, the set of attributes including at least one of a read access privilege, a write access privilege, or an execute access privilege for the computing resource;
    in response to a determination that the requestor has a privilege to perform an association of the set of attributes to the access control set for the predetermined set of users, updating, via the monitoring service, the access control set with the association to the set of attributes,

wherein the updating the access control set causes one or more cryptographic keys associated with the access control set to receive the set of attributes;

aggregating data across a plurality of domains, including the domain; and determining from the aggregated data whether a malicious event has occurred in one or more of the plurality of domains.

\* \* \* \* \*